Dec. 25, 1956     L. J. LEITNER ET AL     2,775,355
CARGO CARRIER
Filed April 19, 1954     2 Sheets-Sheet 1
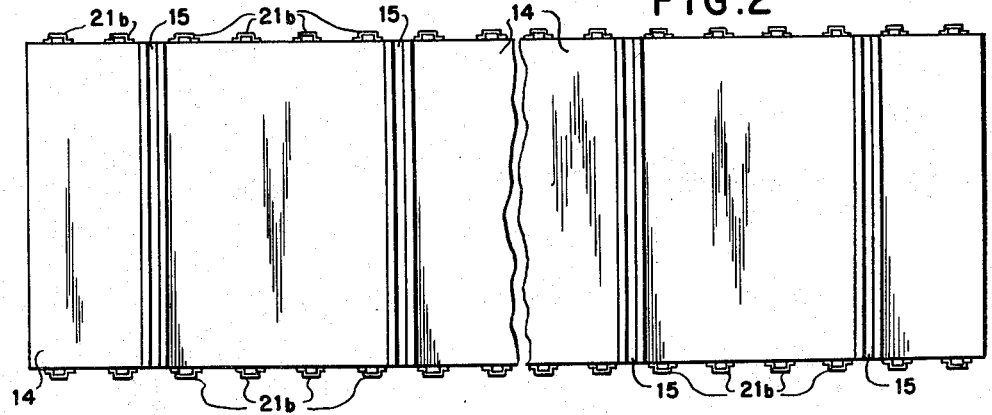
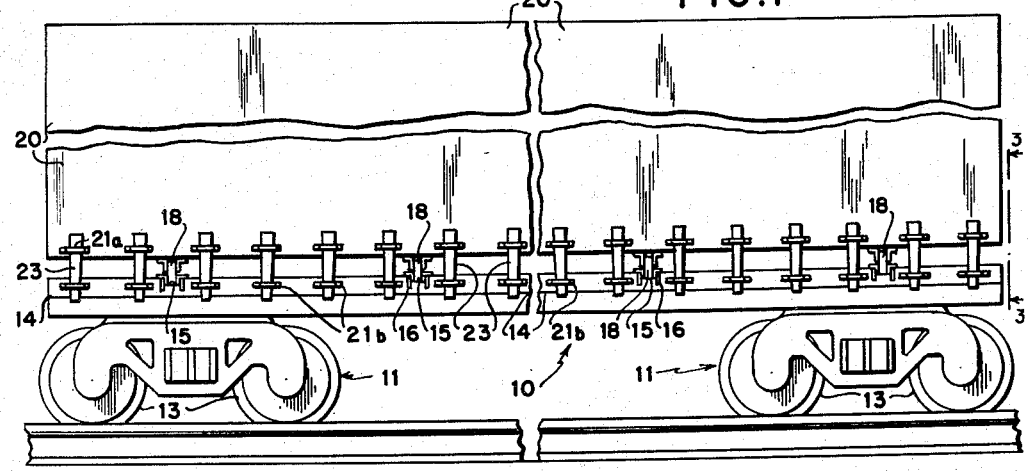
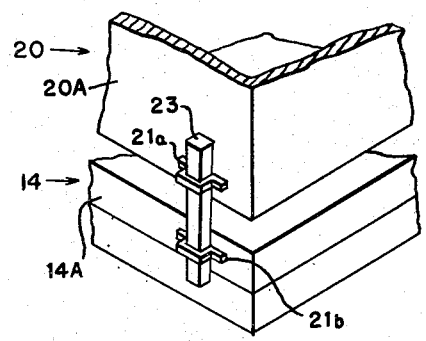
INVENTORS
Lionel Judah Leitner
Irving Abraham Leitner
BY
ATTORNEY

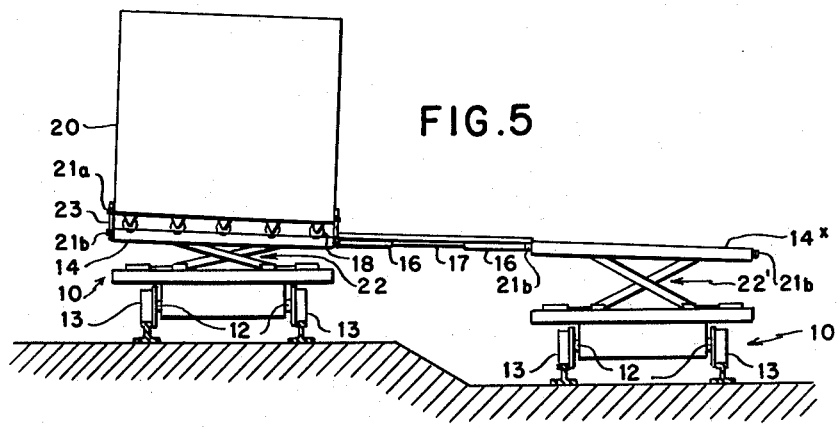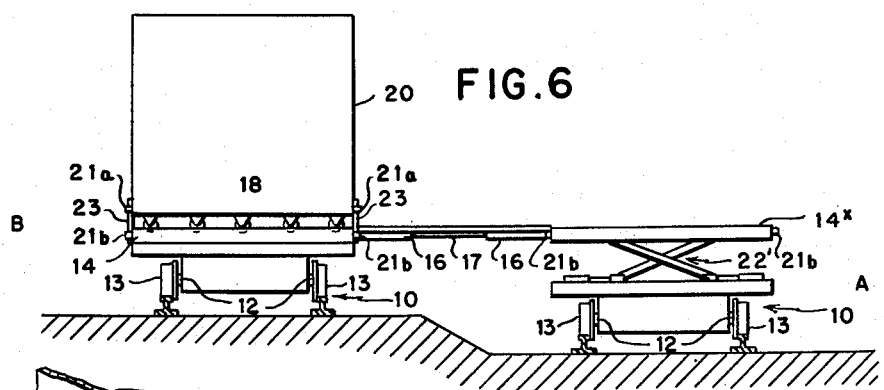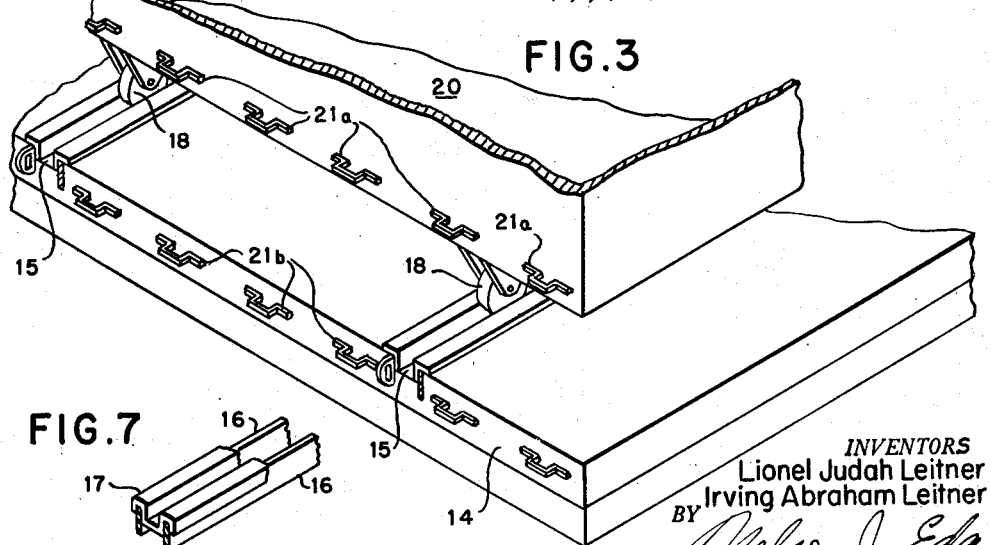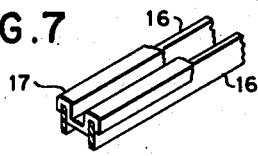

United States Patent Office 2,775,355
Patented Dec. 25, 1956

2,775,355

CARGO CARRIER

Lionel J. Leitner and Irving A. Leitner, Bronx, N. Y.

Application April 19, 1954, Serial No. 424,129

1 Claim. (Cl. 214—38)

The present invention relates to new and useful improvements in the construction of cargo-carriers and the like.

It is an object of this invention to provide an improved construction for railroad freight cars, freight carrying trucks, trailers and all such freight conveying means commonly employed in carrying heavy freight on tracks, roads, water-ways, etc., which permits transfer of the cargo from the said freight conveying means to a second other freight conveyance or a loading platform, elevator or truck.

It is an object of the present invention to improve the construction of a freight conveyance, as hereinabove, for the purpose of exemplification specified e. g. a railroad flat car or the trailer of a truck, in such manner that a transfer of the cargo carried by and upon said conveyance is accomplished in a novel manner which eliminates the two steps of (1) unloading and (2) loading which are presently required to accomplish transfer, when conveyance means of conventional construction are employed.

It is a further object of the present invention to provide labor and cost saving by permitting cargo-transfer without requiring loading and unloading operations incident to such transfer and by reducing labor requirements in the general handling of the cargo involved. Certain services, incident to the handling of cargo in the conventional manner are also eliminated, when the present invention is employed, accordingly the necessity for warehousing and resulting dunnage expenses are eliminated as the embodiment inherent in the present invention permits storage of the cargo, requiring unloading thereof only once, at the point of ultimate use.

These and other objects and advantages of the present invention will be evident and apparent on hand of the detailed description of the preferred form of the invention as represented in the drawings in which:

Fig. 1 is a view in side-elevation, showing a railroad flat car embodying the construction of the invention.

Fig. 2 is a top plan view of Fig. 1.

Fig. 3 is a perspective view in side elevation along the line 3—3, of Fig. 1.

Fig. 4 is a view corresponding to the view illustrated in Fig. 3 however the operational stage illustrating the invention as shown differs from the operational stage illustrated in Fig. 3.

Fig. 5 is a plan view in front elevation showing two flat cars embodying the invention and particularly illustrating the transfer of cargo in an angulated plane.

Fig. 6 is a view corresponding to the view illustrated in Fig. 5, however the level transfer of cargo is particularly illustrated.

Fig. 7 is a view in perspective elevation, of the track or rail means employed in the construction set forth.

Referring now to the specific form of the invention as shown in the drawings, it will be seen that a flatcar chassis 10 consisting of the fixedly framed trucks 11 provided each with two axles 12 and wheels 13, is provided.

A platform member 14 is mounted fixedly upon the framed trucks 11 and the chassis 10 completing the substructure of the flatcar.

In accordance with the present invention the platform-member 14 is provided with the transverse grooves 15 in the marginal side portions of which the bars 16 are disposed. The bars 16 can be moved in the grooved spaces of the platform member 14 so that the bars 16 can be extended parallel to the end portion of the platform member 14 and at right angles to the sides thereof forming an extension across and beyond the terminating point of the sides.

When the bars 16 are extended in the lateral plane forming an extension as aforesaid, rail-sections 17 may be placed on the bars 16 to form substantially a track.

The bars 16 may accordingly be extended beyond the side-margin of the side of the platform 14 and led into a groove corresponding to groove 15 in another flatcar laterally spaced from the former on an adjacent railroad track as illustrated in Fig. 5 and Fig. 6. In order to transform the thusly extended bars 16 into a usable track, a sufficient number of rail-sections 17 are placed upon the bars 16 and the gap between the two flatcars is accordingly bridged.

Upon the aforementioned tracks which are formed by multiple, spaced apart, transverse grooves 15 in combination with the bars 16 and rail-sections 17 the cargo-sections 20 are placed. The cargo-sections 20 may be either platforms or boxes of sufficient size, adapted to carry the actual cargo-load. In the bottom of these cargo-sections 20 provision is made to fixedly provide means to carry the rollers or wheels 18 which are adapted to travel in the tracks provided in the platform member 14 and such tracks as are formed by the bars 16 and rail-sections 17 extending beyond the sides of said platform member 14.

The rail-sections 17 may be provided in the form of varied size members so as to permit the bridging of gaps or distances of varied size between the flatcar platform member 14 to be unloaded and the platform member 14x to be loaded (see Figs. 5 and 6).

To permit level transfer of the cargo-section 20 from platform memebr 14 of the one flatcar to the platform member 14x of the other flatcar when the railroad track-bed of flatcar A is below the track-bed of flatcar B, a provision is made to provide the jacklifts 22 and 22' which are adapted to elevate the platform member 14 in the horizontal plane and lift the said platform member 14 from the chassis 10 of the flatcar. Thus as illustrated in Fig. 6, the platform member 14x of the flatcar A, which stands on a railroad track bed, below the level of the railroad track bed of flatcar B, is elevated by the jacklifts 22 and 22' until the platform member 14x of flatcar A is on the same level and in the same plane as the platform member 14 of flatcar B. When the two platform members 14 and 14x are at equal levels in the horizontal plane however laterally spaced apart, the bars 16 are extended from grooves 15 in platform member 14x and are extended until they enter into the grooves 15 of platform member 14 and sufficient rail-sections 17 are placed on the bars 16 to cover the extended bars 16 passing over and across the space-gap between flatcars A and B to form a track upon which the cargo-sections 20 are moved from one to the other flatcar thus accomplishing a transfer of the cargo, without requiring a loading and unloading operation.

To permit transfer of cargo from flatcars spaced laterally apart, where there is a difference in level, between the railroad tracks of each of the flatcars, the lifts 22 and 22' are furthermore constructed in such manner as to permit angular, unilateral elevation of the platform member 14 so that an angular transfer, substantially in the same manner, as hereinabove described for the purpose of illustrating a level-transfer of cargo (Fig. 6), can be accomplished as specifically illustrated in Fig. 5.

When a cargo section 20 is positioned properly on the platform member 14 after transfer unto said platform member 14 its wheels 18 will be in the grooves 15 of the platform member 14, to avoid lateral, transverse movement of the cargo section 20 while the flatcar is in motion, and the rolling off of the cargo section 20 from the platform member 14 the following arrangement is provided.

The cargo section 20 is provided with a bracket 21a and the platform member 14 is provided with a bracket 21b. These brackets 21a and 21b are spaced equidistantly along the side surfaces 20A, 14A of the cargo section 20 and the flatcar platform member 14 respectively in such manner that when the cargo section 20 is transferred upon the platform member 14 by rolling it along the groove 15 provided therein, the said respective brackets 21a and 21b will be symmetrically superimposed one upon the other when the cargo section 20 is in proper position upon the platform member 14 to commence railway transportation. In order to fasten the cargo section 20 permanently, for the duration of railway transportation, upon the platform member 14 and accordingly on the railway car, fastening pins 23 are driven through the respective brackets 21a and 21b securing cargo section 20 to the flatcar. For the purpose of transfers from one flatcar to another flatcar the brackets 21a and 21b are unlocked by the removal of the fastening pin 23 thus permitting the movement of the cargo section 20 in the groove 15 into which it had been locked in the aforementioned manner prior to the removal of the pins 23.

The brackets 21a and 21b further serve to permit proper alignment of the cargo section 20 on the flatcar when they are linked by means of the fastening pins 23 so that the falling off or bulging of cargo which sometimes occurs when ordinary flatcars with ordinary cargo attached thereto by ordinary means are used for rail transport.

In the above set forth description one specific embodiment of the preferred form of the present invention has been shown and described.

It is understood that the construction set forth as the specific embodiment of the preferred form of the invention herein, can be employed on all types of vehicles and is not necessarily limited to railroad freight cars. Furthermore the grooves adapted to receive the bars 16 which are extended from a platform member mounted for instance on a railroad flatcar, truck, trailer truck, boat and the like may well be provided on a stationary surface such as on a loading platform, in a warehouse floor and the like to permit transfer of the cargo from the conveying means to a storage place or the ultimate destination.

Accordingly it is understood that various modifications and variations of the present invention may be apparent to those skilled in the art.

Variations and modifications of the present invention may be made, as obvious, without thereby departing from the spirit and scope of this invention and therefore, the same is only limited by the scope of the prior art and the appended claim.

Having set forth and described the preferred form of our invention, what we claim and desire to secure by Letters Patent is:

A cargo carrier, having a chassis superstructure comprising in combination a platform member, multiple transverse grooves spacedly provided in the face portion of said platform member, bars slidable within said grooves and substantially adjacent to the side walls thereof, said bars extendable beyond said grooves, said extended bars defining the side margins of each of said grooves beyond the terminal end thereof, said bars adapted to interengage corresponding grooves in a second, like platform member spaced apart from the first platform member, rail sections disposed upon said bars and transversely interlocking said bars to form a track, said track being of substantially the same dimensions as said grooves and traversing the space gap between the spaced apart platform members, cargo sections, means provided on the bottom of said cargo sections for engagement with and movement in said groove and on said track respectively, said cargo sections adapted to be moved from platform member to platform member, and corresponding means provided on the lateral side surfaces of said cargo sections and said platform members adapted to permit fixed locking engagement between said cargo sections and the platform member by means of a locking pin to prevent lateral movement of said cargo sections with respect to the platform member while the platform member is in rail transport.

References Cited in the file of this patent

UNITED STATES PATENTS

| | | |
|---|---|---|
| 426,385 | Jones | Apr. 22, 1890 |
| 1,521,156 | Jenkins | Dec. 30, 1924 |
| 1,921,605 | Canfield | Aug. 8, 1933 |
| 2,287,068 | Shonnard | June 23, 1942 |
| 2,512,798 | Hodges | June 27, 1950 |

FOREIGN PATENTS

| | | |
|---|---|---|
| 23,118 | Australia | June 19, 1935 |